United States Patent [19]

Barkhoudarian et al.

[11] Patent Number: 4,620,093
[45] Date of Patent: Oct. 28, 1986

[54] OPTICAL PRESSURE SENSOR

[75] Inventors: Sarkis Barkhoudarian, Canoga Park; Rudolf R. Aügüst, Laguna Beach; Jonathan M. Maram, Chatsworth, all of Calif.

[73] Assignee: Rockwell International Corporation, El Segundo, Calif.

[21] Appl. No.: 547,305

[22] Filed: Oct. 31, 1983

[51] Int. Cl.$^4$ .............................................. G01D 5/34
[52] U.S. Cl. .................... 250/231 P; 73/705; 250/550
[58] Field of Search ............... 250/231 R, 231 P, 227, 250/237 R, 237 G, 230, 550; 73/653, 655, 656, 657, 705, 722, 728

[56] References Cited

U.S. PATENT DOCUMENTS

| | | | |
|---|---|---|---|
| 3,590,640 | 7/1971 | Cindrich | 250/231 P |
| 4,160,600 | 7/1979 | Luke | 73/705 |
| 4,499,373 | 2/1985 | Johnston | 73/705 |
| 4,509,370 | 4/1985 | Hirschfeld | 250/231 P |

Primary Examiner—David C. Nelms
Attorney, Agent, or Firm—H. Fredrick Hamann; Harry B. Field; Lawrence N. Ginsberg

[57] ABSTRACT

An optical pressure sensor 10 for measuring the pressure within a container 12 such as a combustion chamber of a rocket engine, wherein pressure sensor 10 comprises a pressure deflectable diaphragm 14 in communication with container 12 and which includes an optical grating 22 on one of its surfaces, means 18 for directing a laser 20 to strike optical grating 22 from a fixed direction to form a central diffracted beam 24 and a first order diffracted beam 26, a photo-position detector 60 for generating signals responsive to the changes in position of the central and first order diffracted beams 24 and 26 resulting from the effects of pressure and temperature upon the diaphragm 14, and means 30 for synthesizing a temperature-adjusted indication of the pressure in the subject container from said responsive signals.

18 Claims, 12 Drawing Figures

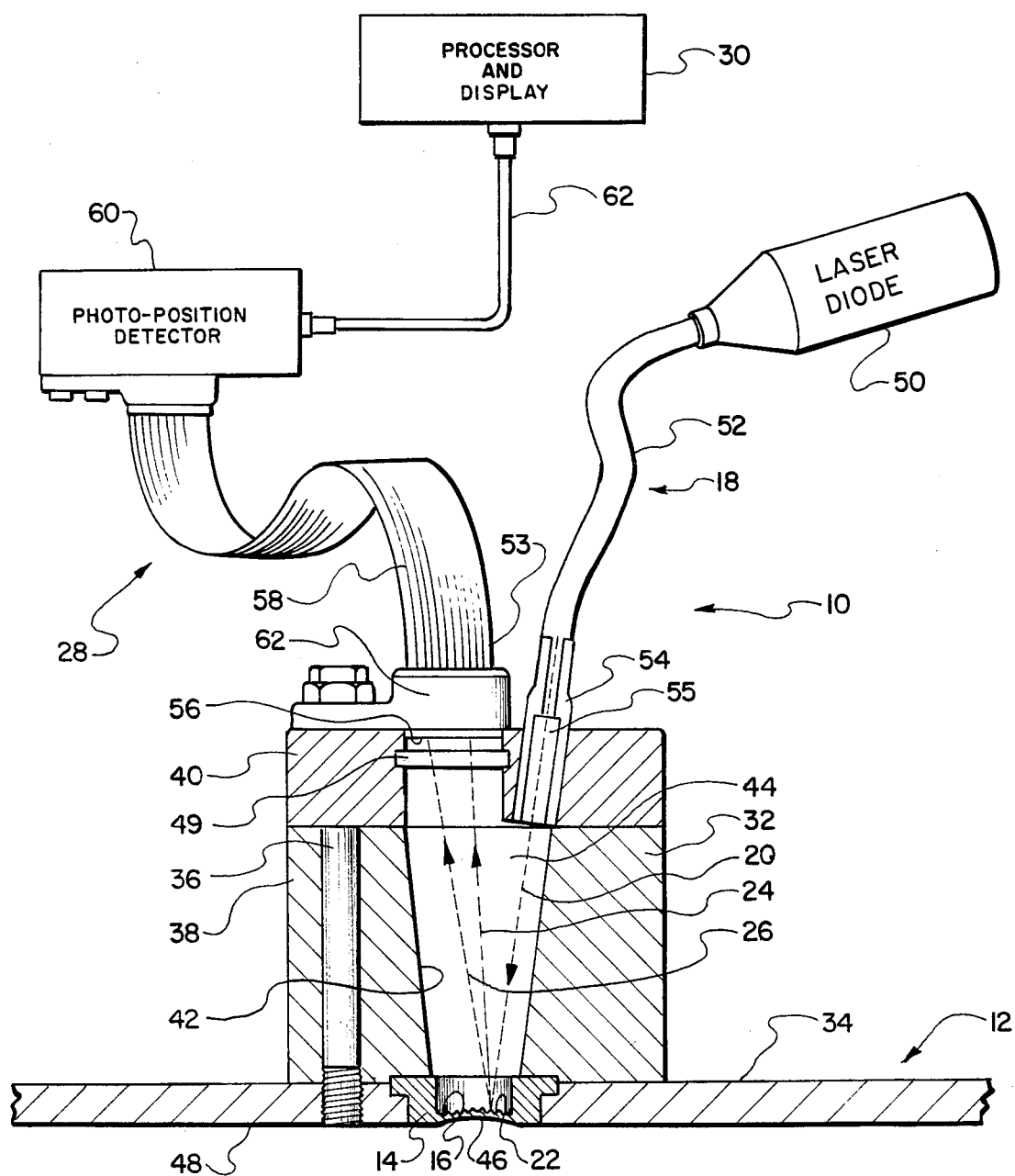
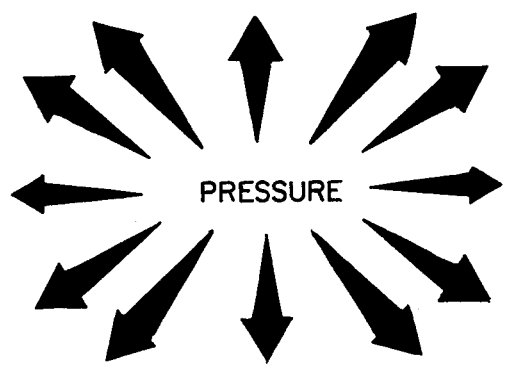
Fig.1.

OPTICAL PRESSURE SENSOR

BACKGROUND OF THE INVENTION

1. Field of the Invention

The present invention relates to devices for measuring pressure and more particularly, to devices which utilize optical means for the measurement of pressure.

2. Description of the Prior Art

Rocket engines for space missions beyond the present decade will be required to operate for longer periods of time, withstand many more firing cycles and offer more reliability than present-day engines. Such improved performance, however, will prove obtainable only if direct, on-board instrumentation can be provided to monitor pressures at certain critical locations within the engine. With such provisions, engine operation can be more effectively controlled for purposes of efficiency, endurance and safety.

For a pressure probe to be suitable for in-flight application, it must not only provide highly responsive and accurate pressure readings, but also it must be small and lightweight, yet capable of withstanding the rigorous environment of the rocket engine. Heretofore, pressure sensors have proven limited for in-flight application, for even the most advanced prior art pressure sensors such as those used in the Space Shuttle Main Engine ("SSME") provide only limited performance and add unacceptable amounts of weight and complication to the engine system.

The pressure sensors on the SSME generally comprise a remote pressure transducer, a pressure tap at the location of interest and a pressure tube for connecting the two. A typical construction for the transducer employs a pressure deflectable diaphragm and a strain gauge affixed thereto for generating signals which are then applied to a balanced bridge-type of a circuit. These sensors offer only limited responsiveness because the pressure tube dampens out the pressure pulses picked up by the pressure tap and the responsiveness is so affected that these probes are suitable for reading only steady state conditions. This limitation could of course be improved if the transducer were mounted directly at the location of interest; however, these locations are usually high-temperature regions whereat the transducers cannot operate properly without complicated cooling arrangements. Even when these transducers incorporate temperature resistent materials, their performance becomes wholly unacceptable at temperatures above 1300° F. Thus the strategy has remained to link the transducers to the points of measurement by means of pressure tubes to thereby thermally isolate the sensor and consequently these pressure sensors have remained useless for measuring transients, instabilities and other conditions necessary for effective engine monitorization. Moreover, their installation requires the addition of 20 pressure tubes and forty extra flanges to the SSME engine system, adding greatly to its weight and complexity.

There is another class of pressure sensors which utilize a reflective, pressure deflectable diaphragm and a bundle of optical fibers whose end is positioned over the center of the diaphragm. Some of the optical fibers of the bundle serve as a source of an incident beam which strikes the reflective diaphragm to form a reflected beam. The reflected beam is then received by the remaining portion of the optical fibers and the characteristics of the two beams are compared. Because the deflection of the reflective surface changes the length of the optical path of the two beams, the comparison of such parameters as the beams' relative intensities or width can be related to the deflection of the surface, which changes can then be correlated to the level of pressures causing the subject deflections. However, these devices suffer from the crippling disadvantage that the bundle of optical fibers needs to be placed extremely close to the reflective diaphragm (on the order of one millimeter). This requirement subjects the optical fibers to any heat transferred to the reflective diaphragm, which exposure can affect the performance of this type of sensor and will invariably cause it to fail at elevated temperatures.

OBJECTS OF THE INVENTION

Accordingly, it is an object of the present invention to provide a pressure sensor which is readily adaptable to flight-operated engine systems by reason of its simplicity, unobtrusiveness and freedom from temperature dependence.

It is yet another object of the present invention to provide a pressure sensor which does not require the use of a pressure tap and accordingly does not disturb the flow conditions within the target chamber so that accurate pressure readings are obtained.

It is still another object of the present invention to provide a pressure probe whose installation does not require a significant engineering effort.

It is yet a further object of the present invention to provide a pressure sensor which is not temperature-dependent and is capable of providing accurate readings of pressure over a broad range of temperatures and over a broad range of frequencies of pressure variations.

It is still another object of the present invention to provide a pressure sensor which does not require the installation of pressure tubes.

It is yet another object of the present invention to provide a pressure sensor which provides both high frequency response and accuracy.

It is still a further object of the present invention to provide a pressure sensor which is highly dynamic in response, yet requires no special cooling arrangements.

It is yet a further object of the present invention to provide a highly dynamic pressure sensor which can withstand high temperatures.

Yet another object of this invention is to provide a pressure sensor which can thermally isolate temperature sensitive elements without affecting its performance so that the invention can provide highly responsive and accurate pressure readings even at extremely high temperatures.

It is yet another object of the present invention to provide a pressure sensor capable of providing direct, on-board monitorization of pressures at critical locations in rocket or other types of engines so that engine operation can be more effectively controlled.

SUMMARY OF THE INVENTION

The present invention achieves all these and other objects by providing an optical pressure sensor for measuring the pressure within a container such as a combustion chamber of a rocket engine, wherein the pressure sensor comprises a pressure deflectable diaphragm in communication with the subject container and which includes a diffraction grating on one of its surfaces, means for directing a laser to strike the optical grating from a fixed direction to form a central diffracted beam and a first order diffracted beam, a photo-position detector for generating signals responsive to the changes in position of the central and first order diffracted beams as a result of the effects of pressure and temperature upon the diaphragm, and means for synthesizing a temperature-adjusted indication of the pressure in the subject container from said responsive signals.

Other objects, advantages and novel features of the present invention will become apparent from the following detailed description of the invention when considered in conjunction with the accompanying drawing.

BRIEF DESCRIPTION OF THE DRAWINGS

FIG. 1 is a schematic of the preferred embodiment of the present wherein the optical housing and the elements therein are shown in cross-section.

The same elements or parts throughout the figures of the drawing are designated by the same reference characters, while equivalent elements bear a prime designation.

DETAILED DESCRIPTION OF THE PREFERRED EMBODIMENTS

Figure 2:
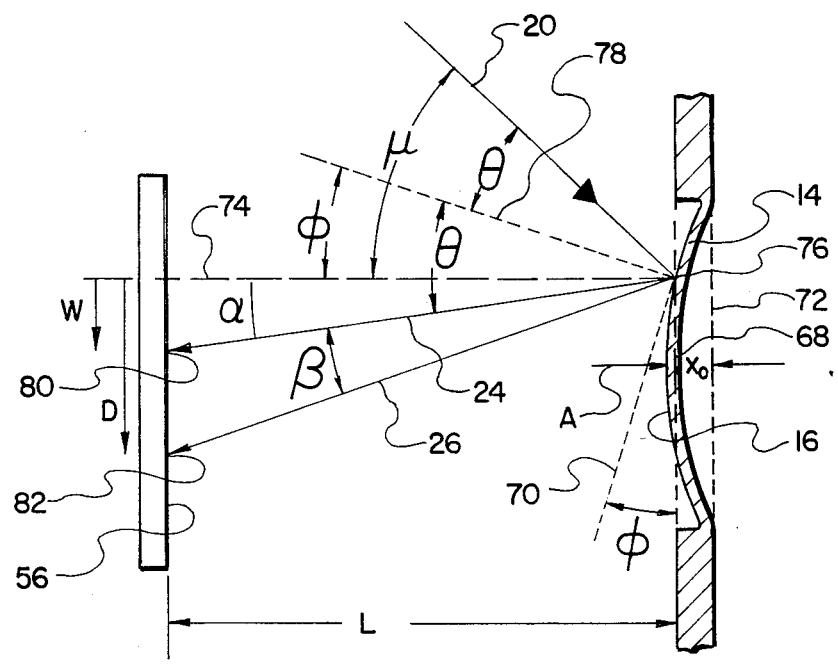
FIG. 2 is a detail cross-sectional view of the diaphragm to show the geometrical relationships between the incident laser beam and the pressure-induced bulge in the diaphragm of the present invention.

Referring to FIG. 1, the present invention provides an optical pressure sensor 10 for measuring the pressure within a pressurized vessel or container 12, which sensor 10 comprises a pressure deflectable diaphragm 14 in communication with the pressure within container 12 such that the pressure therein causes upper surface 16 of diaphragm 14 to bulge, means generally designated 18 for directing an incident laser beam 20 to strike surface 16 from a fixed direction, a diffraction grating 22 on surface 16 for diffracting incidental laser beam 20 into a central diffracted beam 24 and a first order diffracted beam 26, means generally designated 28 for generating signals responsive to the positions of the central and first order diffracted beams 24 and 26, and a processor 30 for synthesizing and displaying a temperature compensated reading of pressure from the signals generated by means 28. By such arrangement, highly accurate and highly responsive readings of pressure can be obtained without intrusion into the subject container 12 and without use of bulky and complicated machinery. Additionally, the arrangement provides temperature compensated readings of pressure over a wide range of temperatures, which can include a range from $-20°$ F. to $2000°$ F. or beyond, and it can provide such readings over a broad frequency range of variations in pressure.

The preferred embodiment incorporates several of these general features in a housing 32 which is attached to wall 34 of container 12 by a bolt 36 or other suitable means for attachment. It is to be understood that container 12 can be any pressurized subject such as a rocket nozzle, a combustion chamber, furnace or the like. Housing 32 preferably comprises a cylindrical body element 38 and cap 40 welded or brazed thereto. It is also envisioned that housing 32 could be constructed as a unitary element as in the embodiments shown in FIGS. 8 and 10. Interior surfaces 42 and surface 16 of pressure deflectable diaphragm 14 define an internal chamber 44 which is preferably evacuated so that any gases initially contained therein are not allowed to interfere with beams 20, 24 and 26 as they propagate through internal chamber 44. Although optical pressure sensor 10 will perform satisfactorily and in accordance with the present invention without such evacuation, it does improve performance when it can be expected that any gases contained in internal chamber 44 might be driven to elevated temperatures during the course of taking pressure measurements.

Housing 32 also serves to securely position pressure deflectable diaphragm 14 against wall 34 of container 12. Preferably, diaphragm 14 is mounted so that bottom surface 46 is flush with respect to the interior surfaces 48 of wall 34 so that optical pressure probe 10 does not interfere with the conditions of the fluids within container 12.

The means 18 for directing incident laser beam 20 to strike pressure deflectable diaphragm 14 preferably comprises a laser diode 50 and an optical fiber 52 for directing incident laser beam 20 from laser diode 50 into internal chamber 44 of housing 32. Optical fiber 52 can be fixedly secured to housing 32 by means of a sleeve 54 in cap 40. Secured within sleeve 54 is a collimator lens 55. By such arrangement, incident laser beam 20 is directed to strike surface 16 of pressure deflectable diaphragm 14 from a fixed direction. It is to be understood that means other than a laser diode might be used for generating incident laser beam 20, as would be readily apparent to one who is skilled in the art. Moreover, collimator lens 55 might also be given a focusing portion for focusing beam 20 onto upper surface 16 so that the point of incidence is more narrowly defined.

Figure 3:
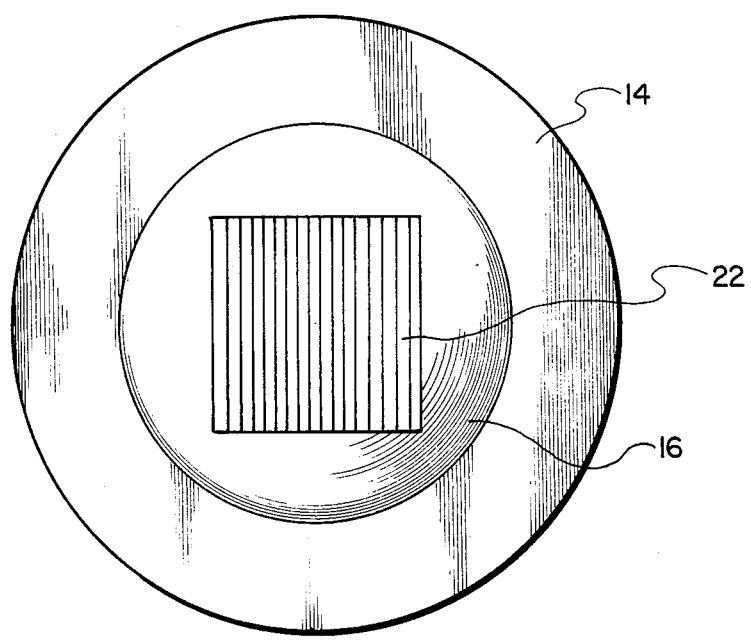
FIG. 3 is a detailed end-view of the pressure deflectable diaphragm as viewed from the direction of the arrow designed "A" in FIG. 2.

Referring to FIG. 3, there is formed upon at least a portion of surface 16 of pressure deflectable diaphragm 14 a diffraction grating 22 suitable for diffracting incident laser beam 20 into central diffracted beam 24 and a first order diffracted beam 26. Although the preferred embodiment is described as utilizing the first order diffracted beam 26, beams of other diffracted orders might be used to equal advantage. Referring back to FIG. 1, central and first order diffracted beams 24 and 26 travel the length of internal chamber 44 before striking the receiving end 56 of a fiber optical ribbon 58, which leads to photo-position detector 60. Fiber optical ribbon 58 is fixedly secured to cap 40 of housing 32 by retainer 62, and ribbon 58 and photo-position detector 60 cooperate to serve as means 28 for generating signals responsive to the position of central and first order diffracted beams 24 and 26. In the preferred embodiment, fiber optic ribbon 58 comprises a series of linearly aligned filaments 53, each comprising a bundle of optical fibers of approximately 0.0005 inch diameter. Fiber optic ribbon serves the important function of allowing photo-position detector 60 to be positioned remotely from housing 32 so that it is thermally isolated form container 12. Unlike the devices of the prior art, this isolation is effected without affecting the responsiveness of pressure sensor 10.

It is to be understood however, that the practice of the present invention can be achieved without the use of fiber optic ribbon 58, in which case photo-position detector 60 receives central and first order diffracted beams 24 and 26 directly. In this embodiment, photo-position detector 60 is affixed directly to cap 40 of housing 32. It is also within the contemplation of the present invention that photo-position detector 60 comprise two detectors, one for each beam 24 and 26, and to provide prisms within the path of central diffracted beam 24, or first order diffracted beam 26, or both, for purposes of increasing the separation therebetween as desired.

Figure 9:
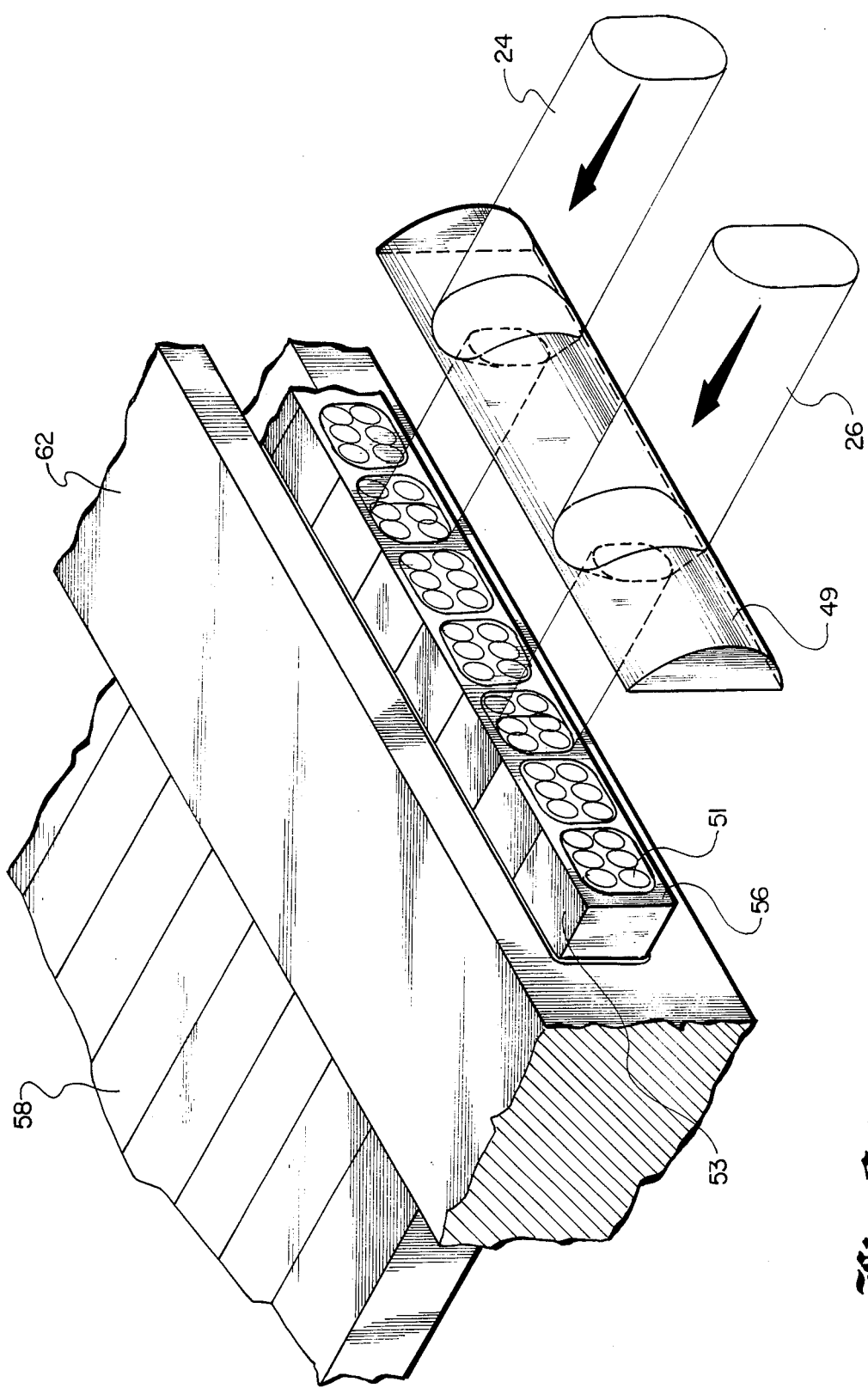
FIG. 9 is a detailed perspective view showing the optical alignment of the half-cylindrical lens employed in the preferred embodiment of FIG. 1.

Housing 32 also preferably secures a lens 49 in optical alignment with receiving end 56 of fiber optic ribbon 58 as is shown in FIG. 9. Lens 49 has the shape of a half-cylinder whose flat side is parallel to receiving end 56. Lens 49 serves to compress central diffracted and first order diffracted beams 24 and 26 so that a greater portion of beams 24 and 26 strike receiving end 56. FIG. 9 also illustrates how individual optical fibers 51 are bundled to form filaments 53 in fiber optic ribbon 58. Other equally workable constructions for ribbon 58 would be readily apparent to one skilled in the art.

Photo-position detector 60 generates signals which are linearly responsive to linear displcements of central diffracted beam 24 and first order diffracted beam 26. These signals are sent through lead 62 to processor 30 wherein circuitry is provided for converting the signals into a temperature compensated reading of pressure in container 12 and displaying same. The mathematic relationships governing these conversions will become apparent in the discussion which follows in reference to FIGS. 2 and 4.

The present invention provides pressure readings by taking advantage of certain geometric relationships arising from the deflection of surface 16 due primarily to pressure in container 12 and secondly, by taking advantage of certain optical relationships arising from the effects of temperature upon diffraction grating 22. The aforementioned geometrical relationships arising from the deflection of surface 16 cause central diffracted beam 24 to change its position on receiving end 56 of fiber optic ribbon 58 in a manner proportional to the pressure applied to pressure-deflective diaphragm 14. However, these changes are somewhat also dependent upon the temperature of pressure-deflective diaphragm 14 and thus require temperature compensation. This temperature compensation, in turn, is accomplished through the aforementioned optical relationships in connection with the effect of the temperature on diaphragm 14 and particularly in regard to the effect of temperature upon the groove spacing of diffraction grating 22. As differences in temperature cause the spacing to expand or contract, the relative position of first order diffracted beam 26 with respect to central diffracted beam 24 will change in a manner almost wholly independent of pressure. Consequently, a signal generated in response to this change in the relative position of beams 24 and 26 provides a basis for adjusting the signal responsive to the absolute position of central diffracted beam 24 to compensate for the temperature dependence in the latter reading.

Referring particularly to FIG. 2, surface 16 of pressure deflectable diaphragm 14 undergoes a pressure-induced deflection according to the following equation governing deflections of circular diaphragms with clamped edges:

$$X = X_o(a^2 - r^2)^2/a^4 \qquad (1)$$

where X is the pressure-induced displacement from equilibrium of a point on pressure deflectable diaphragm 14, r is the radial distance of the point from the center 68 of pressure deflective diaphragm 14, a is the radius of diaphragm 14 and $X_o$ is the displacement at its center. The slope of surface 16 of diaphragm 14 at a given point (X, r), and thus the angle $\phi$ that the tangent 70 to surface 16, makes with respect to the at-rest position of surface 16 is indicated by dotted line 72 is given for small angles by the derivative dX/dr $$\phi = dX/dr = 4X_o r(a^2 - r^2)/a^4. \qquad (2)$$

Referring again to FIG. 2, incident beam 20 approaches pressure deflective diaphragm 14 from a fixed angle $\mu$ as measured with respect to an imaginary line 74 which is normal to the at-rest position 72 of surface 16. Since $\mu$ is constant, the angle of incidence $\theta$ of incident beam 20 with respect to the point of incidence 76 on surface 16 will vary with $\phi$ by reason that $\theta$ is measured with respect to a second imaginary line 78 which is normal to the tangent 70 through point of incidence 76. Also, because the central diffracted beam behaves like a reflected beam, it will propagate from the point of incidence 76 at angle $\theta$ with respect to second line 78. All these relationships allow us to define an angle $\alpha$ for purposes of indicating the position of central diffracted beam 24 upon a receiving end 56 of fiber optical ribbon 58, wherein $$\alpha = 2\theta - \mu \text{(where } \mu = \text{a constant)}, \qquad (3)$$

and since $$\theta = \mu - \phi, \qquad (4)$$

then $$\alpha = \mu - 2\theta, \qquad (5)$$

and $$\alpha = \mu - 8X_o r(a^2 - v^2)/a^4. \qquad (6)$$

If receiving end 56 of fiber optical ribbon 58 is placed in a plane a distance L from point of incidence 76, the pressure-induced change in position W of spot 80 produced by central diffracted beam 24 upon receiving end 56 is given, for small angles, by $$W = -\alpha L = 8LX_o r(a^2 - r^2)/a^4. \quad (7)$$

This value will have a maximum when incident beam 20 is aimed at a point of incidence 76 located at $r = a/3^{\frac{1}{2}}$, given by $$W \cong 3.1 L X_o/a. \quad (8)$$

With the distance to the receiving end 56 (L) equal to 4 inches and the radius a of diaphragm 14 equal to 1/16 inch, it is found that laser spot 80 moves an amount $W \cong 200 X_o$, so that the pressure induced deflection of the diaphragm 14 is effectively amplified 200 times by this arrangement. Furthermore, the deflection at the center of the diaphragm $X_o$, varies linearly with pressure:

$$X_o = 3pa^4(1 - \nu^2)/16t^3 E \quad (9)$$

where a is the radius of the diaphragm 14, t is its thickness, p is the pressure and $\nu$ and E are its Poisson ratio and elastic modulus, respectively. The output of the sensor is therefore:

$$W = (\sqrt{3}/3)(Lp/E)(1 - \nu^2)(a/t)^3 \quad (10)$$

so that the output of optical pressure sensor 10 varies linearly with pressure at a constant temperature. Furthermore, the sensitivity of the detector output W with the pressure can be adjusted by varying the ratio a/t. Thus, optical pressure sensor 10 can be modified to operate within different pressure ranges without altering the electronics or optics of optical pressure sensor 10, but rather by simply using pressure deflectable diaphragms 14 of different dimensions.

Figure 5:
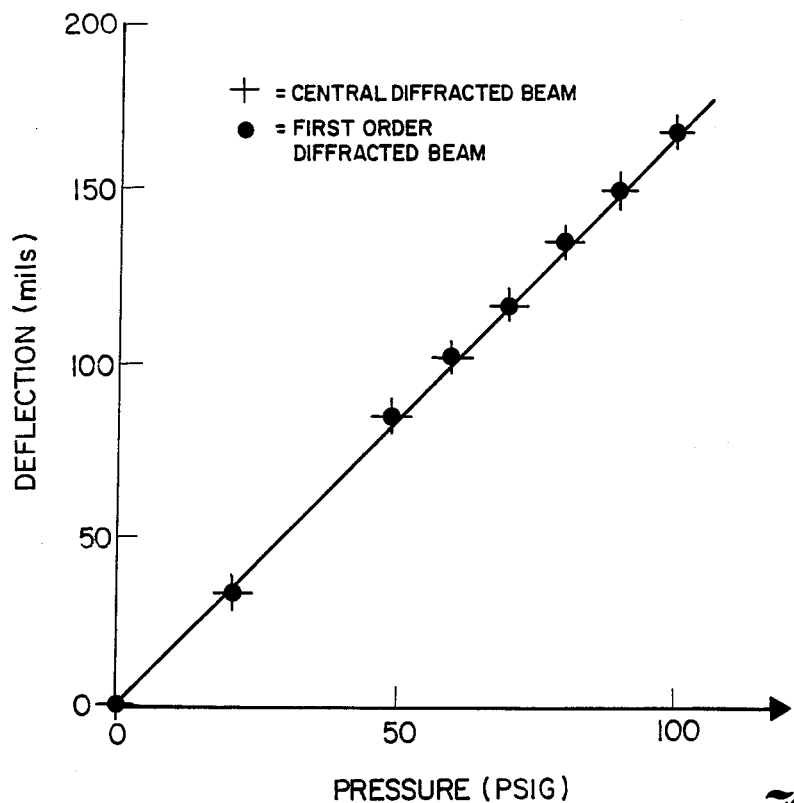
FIG. 5 is a graphical representation of the displacement of the central diffracted beam versus changes of pressure at constant temperature.

To verify the feasibility of the concept for pressure measurements, a calibration test was made of the temperature-uncompensated laboratory bench version of optical pressure sensor 10. A plot of detector output W versus actual pressure p read from a reference gauge over a range of pressure of 0–200 psig is shown in FIG. 5. RMS noise observed at the detector output was about 0.5 mV, or about 0.1 percent of the full scale value of 600 mV at 200 psig pressure. RMS non-linearity calculated from the test data was 0.26 percent full scale. No hysteresis was observed, which result implies that any hysteresis was less than the RMS noise value of 0.1 percent.

As is apparent from the above discussion, a reading of pressure may be obtained from measuring the location W of central diffracted beam 26, alone. However, such a reading would be subject to the effects of temperature, primarily because of the temperature dependence of the elastic modulus (E) of the material used in pressure deflectable diaphragm 14. For a diaphragm 14 constructed from Inconel 718, for example, the output will vary by about 12 percent over range of 0–1000° F.

As previously discussed, the pressure reading obtained from the central diffracted beam 20 can be corrected to account for temperature by providing means for detecting the temperature of pressure deflectable diaphragm 14 and using that temperature to adjust the original pressure reading. Preferably the temperature of diaphragm 14 is measured by detecting the relative position of first order diffracted beam 26 with respect to central diffracted beam 24. The scheme for this temperature compensation is outlined below.

The equation for the angular separation between the central reflected beam and the first-order (assuming $\mu << 1$) is given by:

$$\beta = \sin^{-1}(\lambda/d), \quad (11)$$

where $\lambda$ is the wavelength of the incident beam and d is the spacing of grating 22. If receiving end 56 of fiber optical ribbon 58 is placed a distance L away from point of incidence 76 and if the position D corresponding to the spot 82 produced by first order diffracted beam 26 upon receiving end 56 is known, then the separation s between central diffracted beam 24 and first order diffracted beam 26 will be given by $$s = D - W \cong L(\lambda/D) \quad (12)$$

Assuming $\lambda/d$ is small, the displacements will change due to temperature-induced stretching or contraction of grating 22 by an amount $\Delta s$ given by:

$$\Delta s = (L \lambda/d_o) k_T (T - T_o) \quad (13)$$

where $k_T$ is the coefficient of thermal expansion of the material comprising diaphragm 14, T is the temperature at operating conditions, $T_o$ is a preselected reference temperature such as room temperature, and $d_o$ is the grating spacing at the preselected temperature $T_o$.

For a laboratory tested diaphragm 14 constructed from Inconel with a grating 22 of 3.1-micron spacing and with illumination from a He-Ne laser (wavelength 0.633 microns), this separation of the central beam 24 and first order beam 26 yielded as $\Delta s$ of $2 \times 10^{-5}$ inches for a 3° F. change in temperature, with receiving end 56 of fiber optic ribbon 58 placed four inches away from diaphragm 14. Thus, when using a commercially available photo-position detector 60 having a resolution of $2 \times 10^{-4}$ inches, one readily achieves a resolution in temperature of 30° F. and a resolution in temperature compensation within one-half of one percent, even at the higher temperatures.

This derived temperature information is then used to compensate for the temperature-dependence of the reading of W (the position of central diffracted beam) by the following relationship:

$$W(p,T) = Cp(E_o/E) \quad (14)$$

where C is a constant which is dependent upon only the geometry of the optical pressure sensor 10, and where E and $E_o$ are the elastic moduli for the diaphragm material at the operating temperature and at the preselected reference temperature $T_o$ respectively. Plots of elastic modulus versus temperatures are available for most structural metals so that $E/E_o$ can be determined once T is known. Thus, using equations (10), (13) and (14), the relation between the actual pressure p in container 12 and the measured beam positions, W and D can be directly related.

Figure 4:
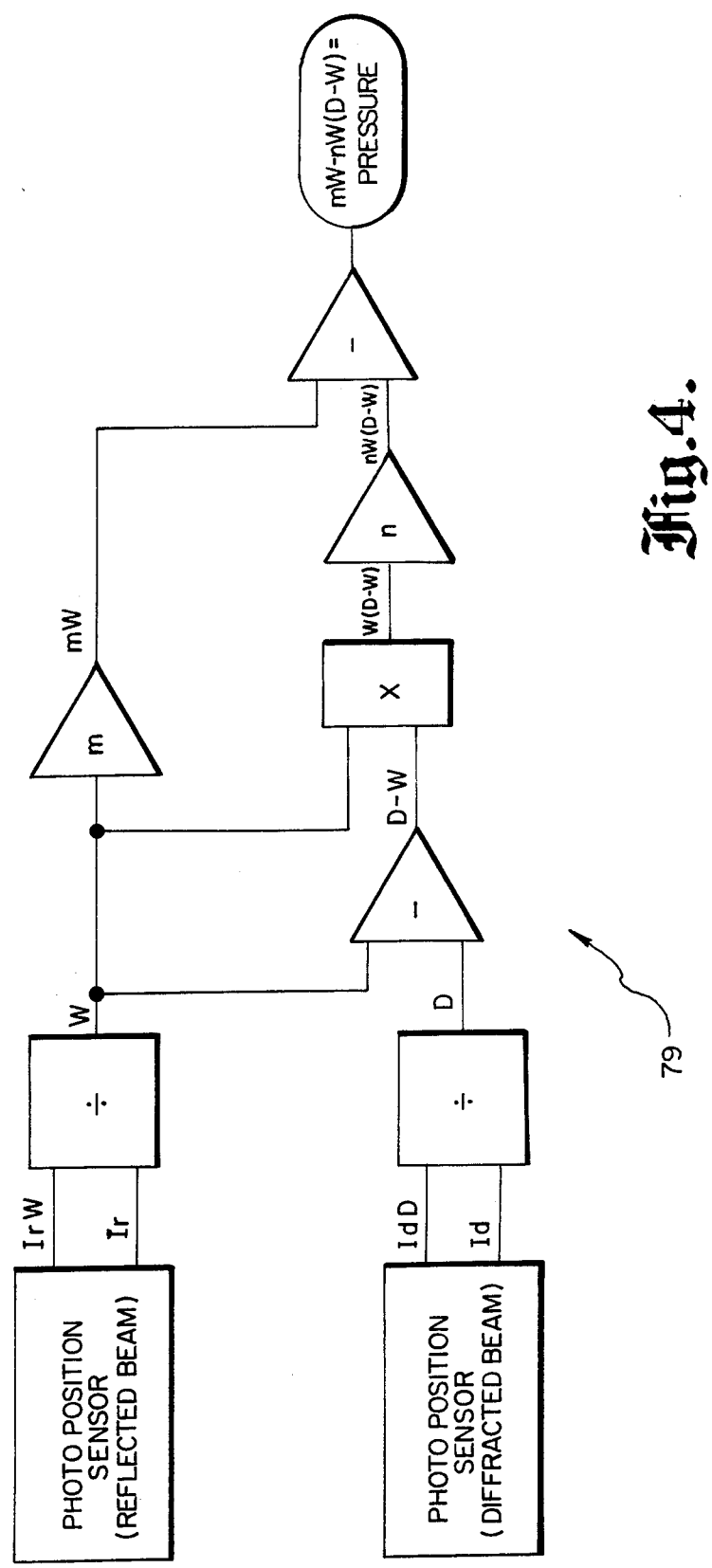
FIG. 4 is a block-diagram representing the logic-flow of the processor of the preferred embodiment of the present invention.

Referring to FIG. 4, processor 30 preferably incorporates an analog circuit 79 which models the aforementioned theoretical relationships according to the following analog relationship:

$$p = mW - nW(D - W) \quad (15)$$

where m and n are predetermined scaling factors which are derivable through calibration procedures as will be explained in the discussion which follow.

In actual operation, it is to be understood that photo-position detector 60 manifests variables W and D as voltage signals whose amplitude vary linearly with the linear displacement of spots 80 and 82, respectively on receiving end 56 of fiber optic ribbon 58. This "raw" voltage reading of W therefore needs to be scaled by scaling factor m to arrive at a number representative of a (temperature uncompensated) reading of pressure. This scaling may be achieved, in practice, by operating pressure sensor 10 on a test container 12 at a preselected temperature ($T_o$) and pressure, such as room temperature and pressure, and then charging (test) container 12 to a known second pressurization (for example 100 psig) to obtain a second voltage reading from circuit 79 (for instance 87 millivolts). This second voltage reading is then calibrated to match the numerical value of the pressure (here, 100 millivolts) by adjustment of the gain in the variable gain amplifier component (the triangle labelled "m" in FIG. 4) of circuit 79. This adjustment in the gain is the manifestation of the factor m within circuit 79 and m is linear with respect to linear changes in pressure. In similar fashion, n is manifested in circuit 79 by the adjustment of the gain in the variable gain amplifier labelled "n" in circuit 79 as derived from taking measurements first at an initial preselected temperature (e.g., $T_o$=room temperature) and a reference known pressure (e.g. p=100 psig) and then at a second temperature (e.g. 500° F.) at the same reference pressure. The gain on amplifier "n" is then adjusted to derive the appropriate numerical value for the term nW(D−W), which, when subtracted from mW, gives the numerical value of the reference pressure. Once m and n are set, pressure sensor 10 is set for accurately reading pressure (p) over a broad range of temperatures and pressures. At extreme pressures and temperatures, however, improved accuracy can be obtained if amplifiers "m" and "n" are referenced to look-up tables or to parabolic approximations of m and n to account for the effect of any plasticity or change in thermal expansion in pressure deflectable diaphragm 14 at those elevated conditions.

It is to be appreciated that pressure sensor 10 provides highly accurate, highly dynamic readings of pressure over a broad range of temperatures and pressures and does so while also protecting its more thermally sensitive components from the temperatures prevailing in the subject container 12. In particular, both photo-position detector 60 and processor 30 may be positioned as remote from housing 32 as desired, and housing 32 itself serves to thermally insulate receiving end 56 of fiber optic ribbon 58 from container 12. Moreover, the accuracy of pressure sensor 10 actually improves as the distance between receiving end 56 and pressure deflectable diaphragm 14 (and container 12) is increased. Consequently, both the accuracy of pressure sensor 10 and its capacity to withstand thermal loading can be optimalized without having to trade off one attribute for the other. This advantage in conjunction with the use of refractory metals or ceramics in diaphragm 14 also allows the present invention to function very effectively at temperatues well above 1300° F. whereat prior art devices fail.

A breadboard diffraction-grating pressure sensing system was designed and assembled, and tests were performed to verify the temperature-compensating capability of optical pressure sensor 10 even at elevated temperatures. In the test system, a central diffracted beam and a first order diffracted beam were intercepted by a pair of linear photo-position detectors mounted 18 inches from the point of incidence on a pressure deflectable diaphragm. The following equipment was included in the test configuration:

Pressure Deflectable Diaphragm—A threaded plug of Inconel 718 with a 1½" diameter, 0.019" thick diaphragm machined into it. For the temperature-compensated tests, a diffraction grating with 3.5 micron spacing was e-beam etched on the diaphragm at the Autonetics Division of Rockwell International.

Photo-position Detector—United Detector Technology LSC-30D continuous single-axis detectors, each with a sensitive area of 1.18"×0.16".

Laser—Spectra Physics 133 He-Ne laser output wavelength 632.8 nm, output power 1 mW.

Reference Gauge—Heise 300 psi F.S. pressure gauge calibrated to 0.1 percent full scale accuracy.

Furnace (for generating pressure within the test chamber)—Robershaw DI Tube Furnace Display—Keithly 177 Digital Voltmeters An analog electronic circuit was included to process the detector outputs and to display a temperature-compensated pressure reading in pounds per square inch. The circuit provides an electronic analog to equation (15) and is illustrated in FIG. 4.

Figure 6:
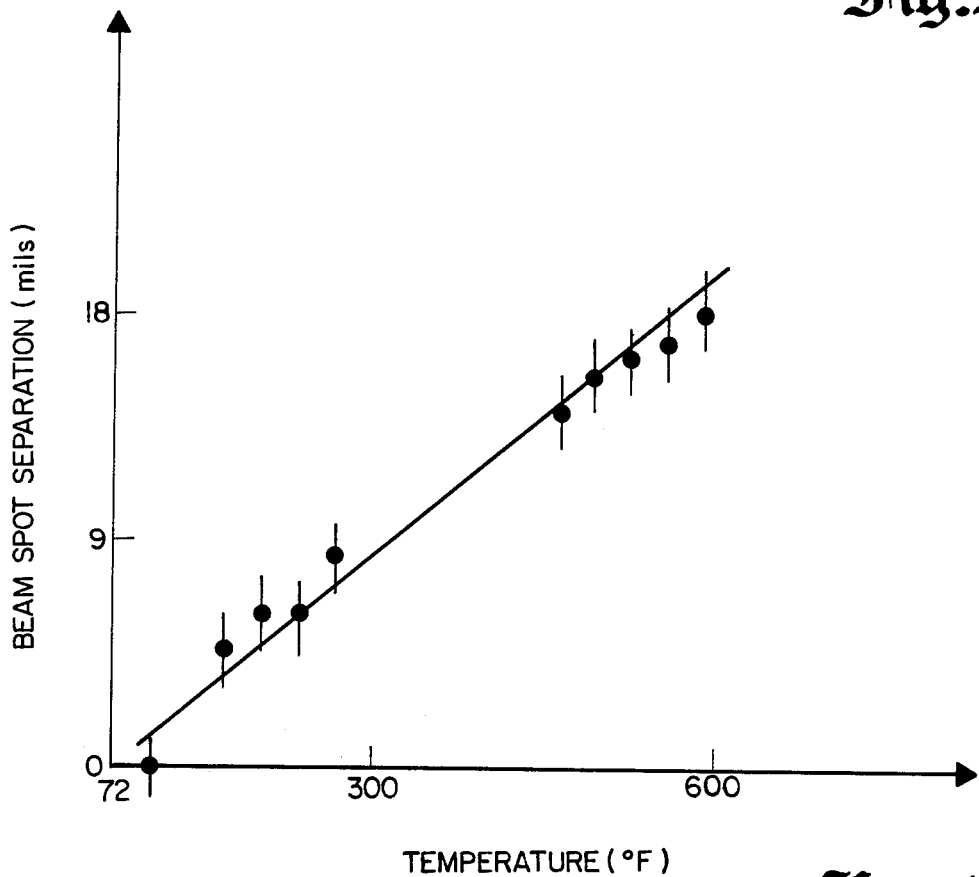
FIG. 6 is a graphical representation of the separation between the first order diffracted beam and the central diffracted beam versus pressure at constant temperature.
Figure 7:
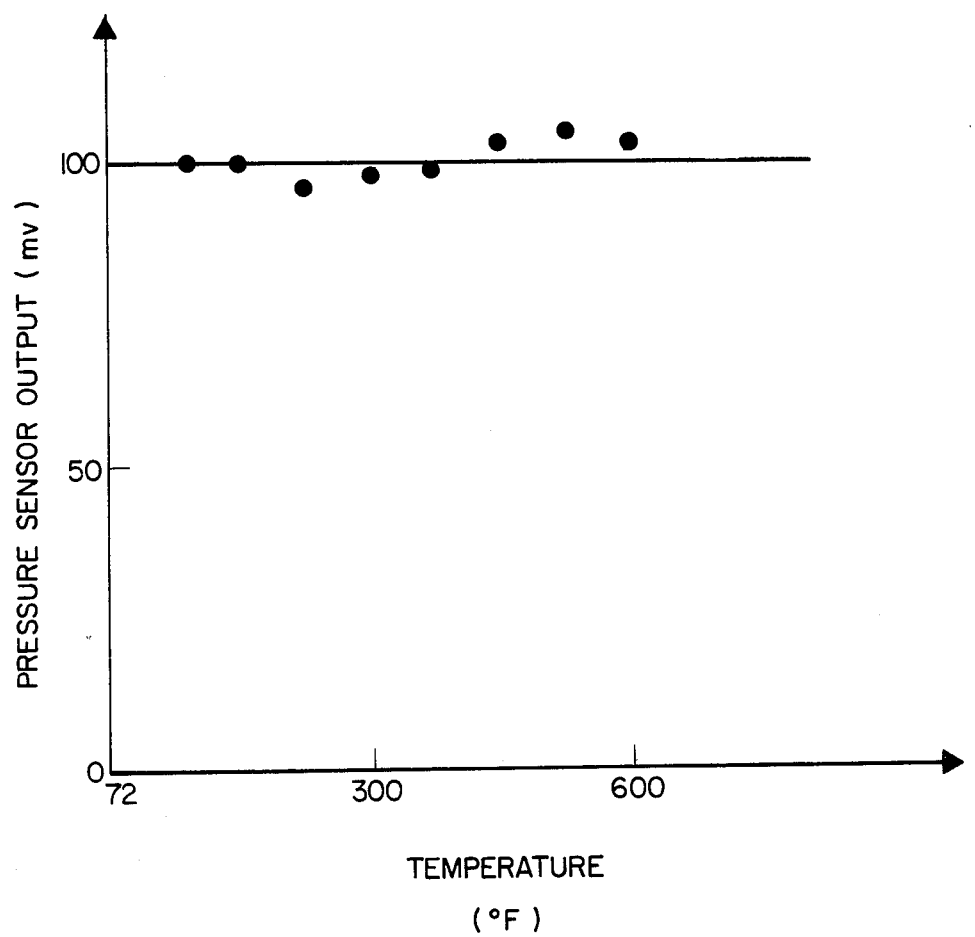
FIG. 7 is a graphical representation of the temperature dependence of the temperature compensated indication of pressure versus temperature.

The following tests were performed on the test apparatus:

The positions of the central diffracted beam and the first order diffracted beam spots W and D, respectively, were plotted against pressure p from 0 to 100 psig at room temperature to verify that the beam spot separation s was independent of pressure. The results were plotted in FIG. 5. FIG. 6 is a graph of the separation s between the spots 80 and 82 as a function of pressure p. As can be seen in this graph, separation s between spots 80 and 82 remained constant to within 1 mil (0.001 inch) while beams 24 and 26 were deflected up to 150 mils as the pressure is increased from 0 to 100 psig. The temperature-compensated output p of experimental pressure sensor at an applied pressure of 100 psi was plotted against temperature from 73° F. to 600° F. in FIG. 7. As the above test results substantiate, particularly those shown in FIG. 7, the present invention provides outstandingly accurate, temperature-compensated readings of pressure.

Figure 8:
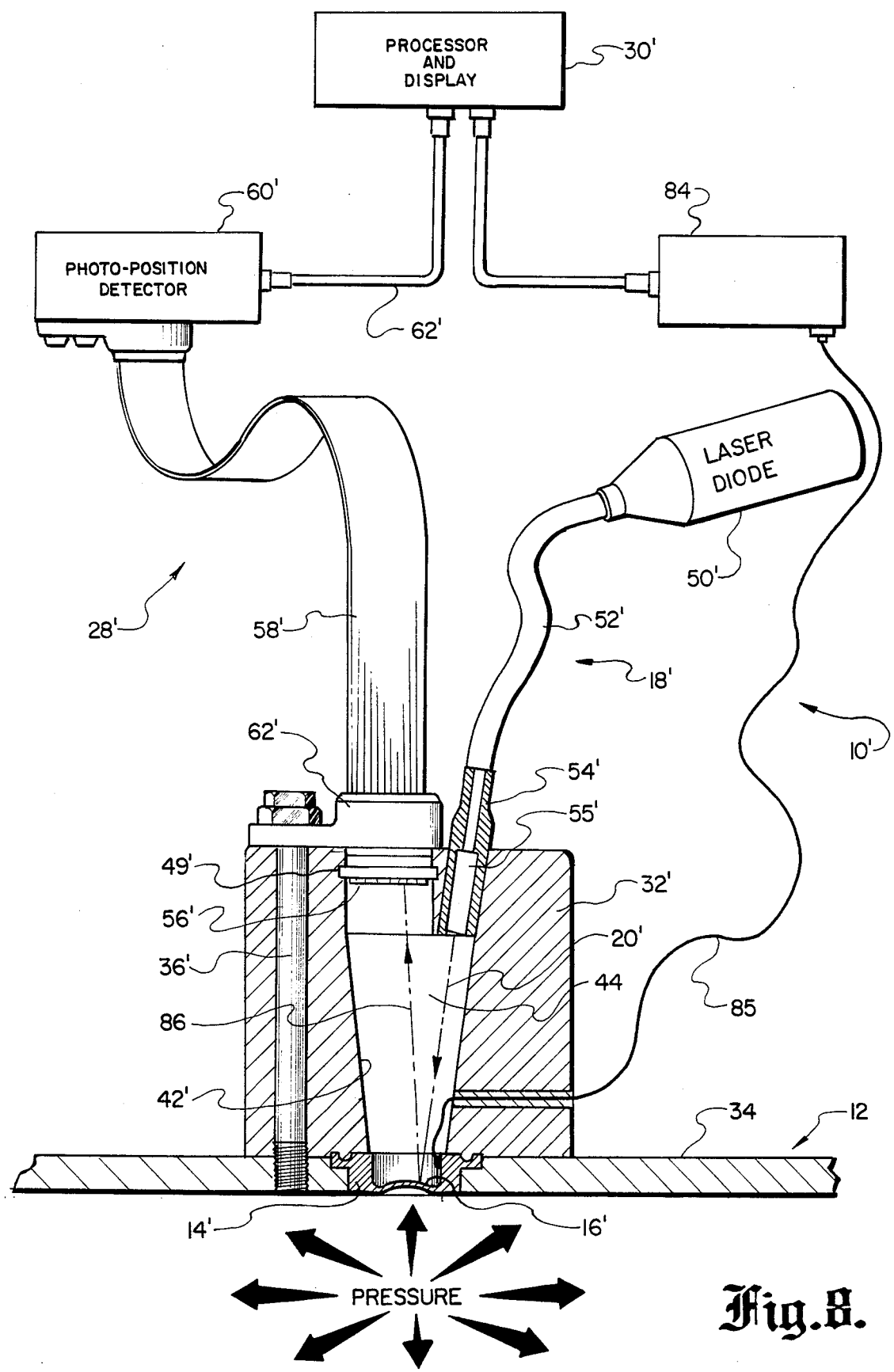
FIG. 8 is an alternate embodiment of the present invention wherein a thermocouple is employed.

Although the preferred embodiment of the present invention has been described as effecting temperature compensation through the use of the first order diffracted beam 26, it might be equally advantageous to measure the temperature of deflectable diaphragm 14' through other means such as a thermocouple 84 having a lead 85 connected to diaphragm 14' as shown in FIG. 8, or any other equivalent device. In this embodiment, the resultant temperature reading would be applied in the same fashion to adjust the initial reading of pressure as determined from the deflection of central diffracted beam 24. In this alternate embodiment, phase grating 22 becomes superfluous, because there is no need to generate an ordered diffracted beam. Thus, in this alternate embodiment, pressure deflectable diaphragm 14' need only be provided with a reflective surface 16' for reflecting incident beam 20' to form reflected beam 86, for it is understood in the art that central diffracted beams and reflected beams have essentially the same properties except that the central diffracted beam has lower intensity. For purposes of definition, the term "reflexive beam" will be used hereinafter as referring to either central diffracted beam 24 of the preferred embodiment or reflected beam 86 as herein described in connection with the alternate embodiment. Reflected beam 86 behaves in the same manner as does central diffracted beam 24 in response to deflections in pressure deflectable diaphragm 14'. It should be noted, however, that this embodiment will likely provide slower responsiveness and smaller capacity for withstanding thermal loading than the preferred embodiment.

In yet another embodiment, especially where temperature is known to be constant, the aforementioned means for measuring the temperature of pressure deflectable diaphragm 14 in either the preferred or alternate embodiment could be omitted for purposes of simplicity. Of course, readings from this latter device would be affected by variations in temperature.

Figure 10:
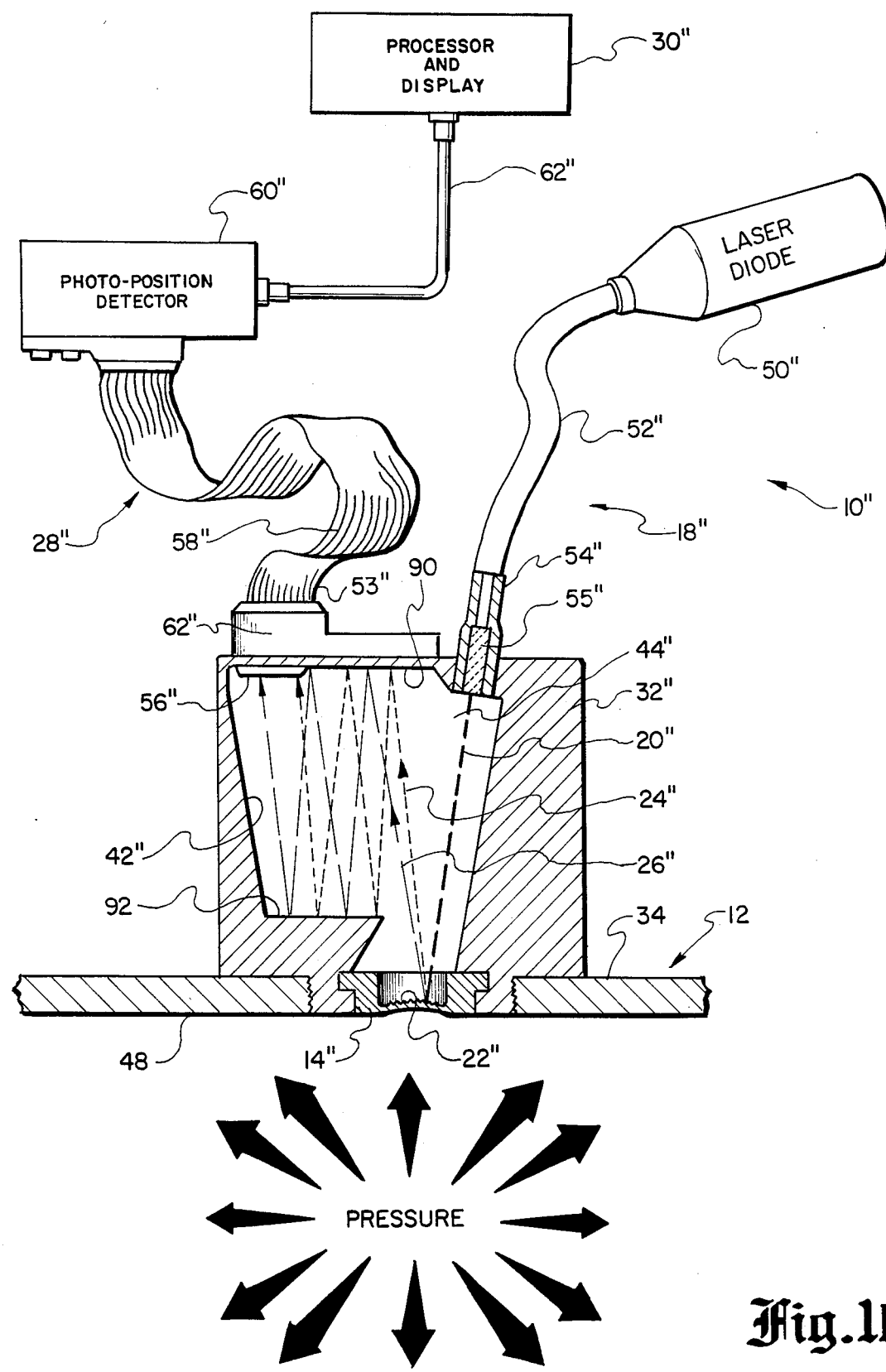
FIG. 10 is another embodiment of the present invention wherein an optical compactor is employed.

FIG. 10 shows another embodiment wherein housing 32 has been modified to include reflective surfaces 90 and 92 for reflecting central diffracted beam 24" and first order diffracted beam 26" within internal chamber 44" so that the effective distance (L) between pressure deflectable diaphragm 14" and receiving end 56" of fiber optic ribbon 58" (L) can be increased while housing 32" remains the same height or is shortened. The resultant increase in L provides greater amplification of the deflection of diaphragm 14" and thus allows for greater precision in the readings of pressure. Moreover, this arrangement allows housing 32" to be made extremely short and compact with an improved capacity to withstand vibration.

Figure 11:
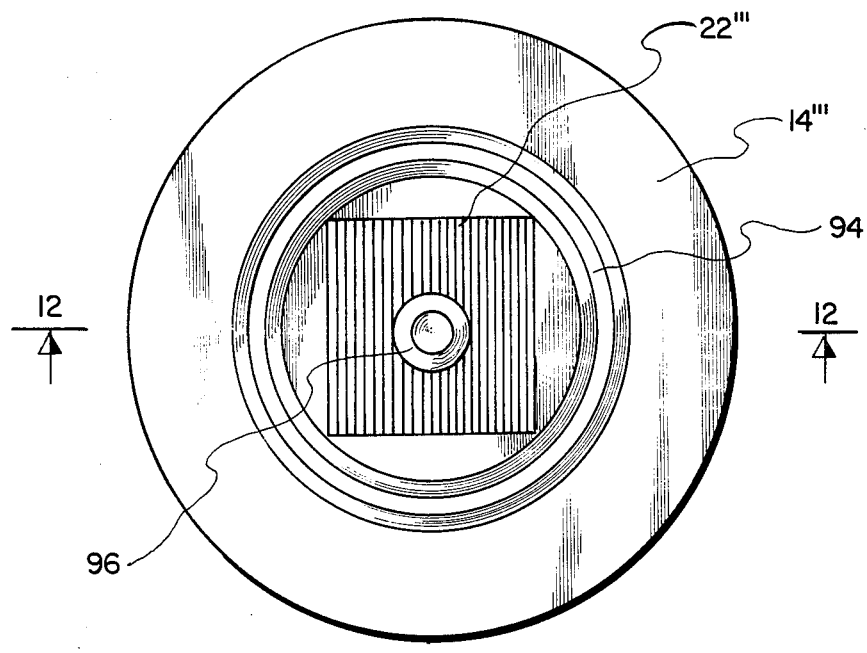
FIG. 11 is a detailed end-view of a variant of the pressure deflectable diaphragm having annular corrugations.
Figure 12:
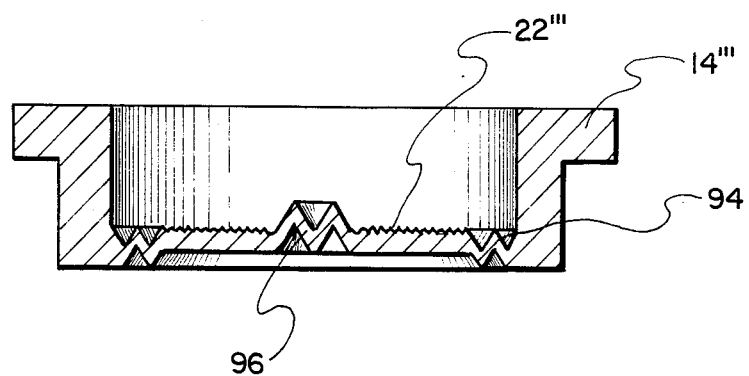
FIG. 12 is a cross-sectional view of the variant pressure deflectable diaphragm as taken from the line A—A in FIG. 11.

FIGS. 11 and 12 show an alternate configuration for pressure deflectable diaphragm 14''' wherein there is provided annular corrugations 94 and 96 which serve to alleviate thermally induced stresses within the diaphragm. Corrugations 94 and 96 allow diaphragm 14''' to expand or contract radially as thermal conditions are varied, thereby allaying any tendency of diaphragm 14''' to otherwise bulge as a result of thermal loading. Corrugations 94 and 96 can also serve to increase the linear range of diaphragm 14''' and its pressure sensitivity. Although corregations 94 and 95 were here given an annular shape, any other geometric arrangement might prove equally effective as would be readily apparent to one skilled in the art.

Obviously, many modifications and variations of the present invention are possible in light of the above teachings. It is therefore to be understood that, within the scope of the appended claims, the invention may be practiced in a manner otherwise than specifically described. Moreover, although the mother of this invention was the necessity to conceive a new pressure probe suitable for on-board flight applications in rockets, the present invention's simplicity, light weight and quick and broad-ranged responsiveness makes it highly suitable for other applications, such as the monitorization of pressure in automobiles, workshop equipment, aircraft and other uses.

What is claimed and desired to be secured by Letters Patent of the United States is:

1. An optical pressure sensor for measuring the pressure within a container, comprising:
    a housing affixed to said container, said housing having interior surfaces;
    a pressure deflectable diaphragm securely emplaced by said housing, said diaphragm having a bottom surface in communication with the pressure within said container and an upper surface having a diffraction grating formed thereon, said upper surface and said interior surfaces of said housing defining an internal chamber;
    means external to said housing for generating a laser beam;
    an optical fiber secured to said housing and connected to said laser generating means for directing said generated laser beam into said internal chamber to strike said diffraction grating on said upper surface of said pressure deflectable diaphragm, said laser beam thereby forming within said internal chamber a central diffracted beam and a first order diffracted beam;
    a fiber optic ribbon having a receiving end secured within said internal chamber across the paths of said central diffracted beam and said first order beam;
    a photo-position detector external to said housing and connected to said fiber optic ribbon, said fiber optic ribbon and photo-position detector cooperating to serve as means for generating signals responsive to the position of said central diffracted beam and said first order beam; and
    a processor for receiving said responsive signals from said photo-position detector and for correlating said responsive signals to a temperature compensated indication of the pressure within said container.

2. The apparatus as claimed in claim 1 wherein said pressure deflectable diaphragm has corrugations, about an outer periphery of said diffraction grating, for allaying the tendency of said pressure deflectable diaphragm to bulge under thermal loading.

3. The apparatus as claimed in claim 1 wherein said interior surfaces of said housing include reflective surfaces in the paths of said central diffracted beam and said first order diffracted beam for increasing the path length between said pressure deflectable diaphragm and said receiving end of said fiber optic ribbon.

4. The apparatus as claimed in claim 1 wherein said apparatus further comprises a collimator lens in optical alignment with said optical fiber for focusing said generated beam onto said upper surface.

5. The apparatus as claimed in claim 1 wherein said apparatus further comprises a lens in optical alignment with said receiving end for compressing said central diffracted beam and said first order diffracted beam so that a greater portion of said beams strike said receiving end than would strike without the lens.

6. An apparatus for measuring the pressure within a container, comprising:
    a pressure deflectable diaphragm in communication with the pressure of said container;
    means for directing a laser beam to strike said pressure deflectable diaphragm;
    means for diffracting a laser beam off a surface of said pressure-deflective diaphragm into a central diffracted beam and an ordered diffracted beam, said means for diffracting located on said surface of said pressure-deflective diaphragm;
    means for generating a first signal indicative of the displacement of said central diffracted beam;
    means for generating a second signal indicative of the change in separation between said ordered diffracted beam and said central diffracted beam; and
    means for correlating said first and second signals to a temperature-compensated indication of the pressure in said container.

7. The apparatus as claimed in claim 6 wherein said diffracting means comprises a grating upon said surface of said pressure deflectable diaphagm.

8. The apparatus as claimed in claim 7 wherein said means for generating a first signal and said means for generating a second signal comprise a linear photo-position detector.

9. The apparatus as claimed in claim 8 wherein said means for correlating said first and second signals comprises an analog electronic circuit for processing said first and second signals and a display apparatus for displaying the output of said analog electronic circuit.

10. The apparatus as claimed in claim 9 wherein said pressure deflectable diaphragm hass corrugations about an outer periphery of said grating for allaying the tendency of said pressure deflectable diaphragm to bulge under thermal loading.

11. The apparatus as claimed in claim 9 wherein said apparatus further comprises reflective surfaces in the paths of said central diffracted beam and said first order diffracted beam for increasing the path length between said pressure deflectable diaphragm and said means for generating said first and second signals.

12. An apparatus for measuring the pressure within a container comprising:
    a pressure deflectable diaphragm in communication with said container;
    means for directing a laser beam to strike a surface of said pressure-deflectable diaphragm to form a reflexive beam;
    means for generating a signal indicative of the position of said reflexive beam;
    means for correlating said signal to an indication of pressure in said container;
    means for sensing the temperature of said pressure deflectable diaphragm; and
    means for adjusting said indication of pressure to compensate for the sensed temperature.

13. The apparatus as claimed in claim 12 wherein said temperature sensing means is a thermocouple communicated with said pressure deflectable diaphragm.

14. The apparatus as claimed in claim 12 wherein said temperature sensing means comprises a grating on said surface of said pressure deflectable diaphragm for creating an ordered refracted beam as well as said reflexive beam, and means for generating a second signal indicative of change in separation between said ordered beam with respect to said reflexive beam.

15. A method for measuring the pressure within a container comprising the steps of:
    forming a pressure deflectable diaphragm in communication with said container;
    diffracting a laser beam off a surface of said pressure deflectable diaphragm to form a central diffracted beam and an ordered diffracted beam;
    measuring the position of said central diffracted beam;
    measuring the change in separation between said ordered diffracted beam and said central diffracted beam;
    correlating said position of said central diffracted beam to a temperature-uncompensated indication of pressure in said container;
    correlating said change in separation of said ordered diffracted beam to an indication of the temperature of said pressure deflectable diaphragm; and
    synthesizing a temperature-adjusted indication of pressure from said uncompensated indication of pressure and said indication of temperature.

16. A method for measuring the pressure within a chamber comprising the steps of:
    forming a pressure deflectable surface in communication with said chamber;
    directing a laser beam to strike said surface to form a reflexive beam;
    measuring the displacement of said reflexive beam from a predetermined position of said reflexive beam when said chamber is at a known pressure; and
    correlating said measurement of displacement to an indication of pressure;
    measuring the temperature of said surface; and
    adjusting said indication of pressure to compensate for said measured temperature.

17. The method as claimed in claim 16 wherein said temperature measuring step comprises providing a thermocouple communicated with said surface.

18. The method as claimed in claim 16 wherein said temperature measuring step comprises:
    forming a diffraction grating upon said surface for creating said reflexive beam as well as an ordered diffracted laser beam;
    measuring the changes in the separation between said reflexive beam and said ordered diffracted beam; and
    correlating said changes in separation to an indication of temperature.

* * * * *